United States Patent
Ko et al.

(10) Patent No.: US 11,522,188 B2
(45) Date of Patent: Dec. 6, 2022

(54) POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicants: Panasonic Corporation, Kadoma (JP); TOYOTA JIDOSHA KABUSHIKI KAISHA, Toyota (JP)

(72) Inventors: Takashi Ko, Hyogo (JP); Shinya Suzuki, Hyogo (JP); Fumiharu Niina, Hyogo (JP); Sho Tsuruta, Hyogo (JP); Natsumi Goto, Hyogo (JP); Ryo Hanazaki, Toyota (JP)

(73) Assignees: PANASONIC HOLDINGS CORPORATION, Kadoma (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 17/028,258

(22) Filed: Sep. 22, 2020

(65) Prior Publication Data
US 2021/0098786 A1    Apr. 1, 2021

(30) Foreign Application Priority Data
Sep. 26, 2019  (JP) .............................. JP2019-175797

(51) Int. Cl.
*H01B 1/08*       (2006.01)
*H01M 4/505*     (2010.01)
(Continued)

(52) U.S. Cl.
CPC ............ *H01M 4/525* (2013.01); *C01G 53/50* (2013.01); *H01B 1/08* (2013.01); *H01M 4/366* (2013.01);
(Continued)

(58) Field of Classification Search
CPC ........... H01B 1/00; H01B 1/08; C01G 53/50; H01M 4/36; H01M 4/366; H01M 4/505
See application file for complete search history.

(56) References Cited

U.S. PATENT DOCUMENTS

| | | | |
|---|---|---|---|
| 2016/0301071 A1* | 10/2016 | Shizuka | H01M 10/0525 |
| 2021/0036321 A1* | 2/2021 | Donoue | H01M 4/364 |
| 2022/0166007 A1* | 5/2022 | Ko | H01M 4/5825 |

FOREIGN PATENT DOCUMENTS

| | | |
|---|---|---|
| JP | 2004-253305 A | 9/2004 |
| JP | 2010-40382 A | 2/2010 |

* cited by examiner

*Primary Examiner* — Mark Kopec
(74) *Attorney, Agent, or Firm* — WHDA, LLP

(57) ABSTRACT

An advantage is to provide a non-aqueous electrolyte secondary battery with improved heat resistance. A positive electrode active material contains a lithium-transition metal composite oxide containing 80 mol % or more of Ni and 0.1 mol % to 1.5 mol % of B on the basis of the total number of moles of metal elements excluding Li, and B and at least one element (M1) selected from Groups 4 to 6 are present on at least the surfaces of particles of the composite oxide. When particles having a volume-based particle size larger than 70% particle size (D70) are first particles, and particles having a volume-based particle size smaller than 30% particle size (D30) are second particles, the molar fraction of M1 on the basis of the total number of moles of metallic elements excluding Li on the surfaces of the second particles is greater than that of the first particles.

6 Claims, 1 Drawing Sheet

(51) Int. Cl.
  *C01G 53/00*      (2006.01)
  *H01M 4/525*      (2010.01)
  *H01M 4/36*       (2006.01)
  *H01M 10/0525*    (2010.01)
  *H01M 4/02*           (2006.01)

(52) U.S. Cl.
  CPC ....... *H01M 4/505* (2013.01); *H01M 10/0525* (2013.01); *C01P 2002/50* (2013.01); *C01P 2004/53* (2013.01); *C01P 2004/84* (2013.01); *C01P 2006/40* (2013.01); *H01M 2004/021* (2013.01); *H01M 2004/028* (2013.01)

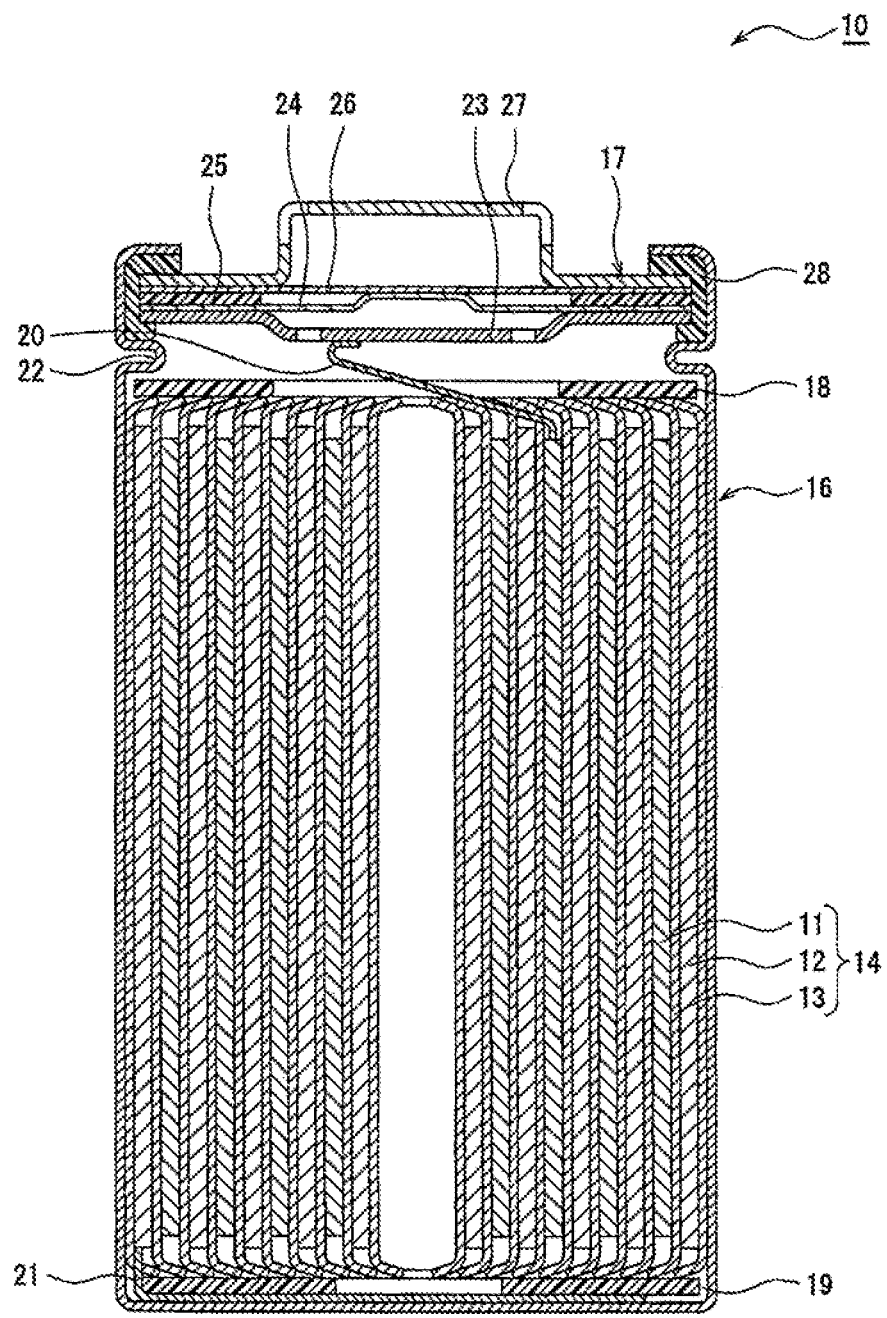
Figure

POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

CROSS REFERENCE TO RELATED APPLICATION

The entire disclosure of Japanese Patent Application No. 2019-175797 filed on Sep. 26, 2019, including the specification, claims, drawings, and abstract, is incorporated herein by reference in its entirety.

TECHNICAL FIELD

The present disclosure relates to a positive electrode active material for a non-aqueous electrolyte secondary battery, and a non-aqueous electrolyte secondary battery with the positive electrode active material.

BACKGROUND

In recent years, lithium-transition metal composite oxides with a high Ni content have been attracting attention as a high energy density positive electrode active material. For example, JP 2004-253305 A discloses a method of allowing a surface-modified lithium nickel composite oxide to be present on the surfaces of particles of a lithium-transition metal composite oxide containing Ni for the purpose of suppressing an increase in battery impedance at high temperatures. JP 2010-40382 A discloses a method of depositing a boric acid compound on the surfaces of particles of a lithium-transition metal composite oxide for the purpose of suppressing gas generation due to decomposition of the electrolyte on the surface of a positive electrode active material in a charged state.

SUMMARY

Technical Problem

Incidentally, for non-aqueous electrolyte secondary batteries such as lithium-ion batteries, a phenomenon known as thermal runaway is known in which a battery in a charged state self-heats at a high temperature, and improvement in heat resistance is an important issue to improve battery reliability. The techniques disclosed in JP 2004-253305 A and JP 2010-40382 A still have room for improvement in heat resistance.

It is an advantage of the present disclosure to improve the heat resistance of a non-aqueous electrolyte secondary battery.

Solution to Problem

In a positive electrode active material for a non-aqueous electrolyte secondary battery which is one aspect of the present disclosure, the positive electrode active material contains a lithium-transition metal composite oxide containing 80 mol % or more of Ni and 0.1 to 1.5 mol % of B on the basis of the total number of moles of metal elements excluding Li, and B and at least one element (M1) selected from Groups 4 to 6 are present on at least the surfaces of particles of the composite oxide. When particles having a volume-based particle size larger than 70% particle size (D70) are first particles, and particles having a volume-based particle size smaller than 30% particle size (D30) are second particles, the molar fraction of M1 on the basis of the total number of moles of metallic elements excluding Li on the surfaces of the second particles is greater than the molar fraction of M1 on the basis of the total number of moles of metallic elements excluding Li on the surfaces of the first particles.

A non-aqueous electrolyte secondary battery which is one aspect of the present disclosure includes a positive electrode containing the aforementioned positive electrode active material; a negative electrode; and a non-aqueous electrolyte.

Advantageous Effects of Invention

With the positive electrode active material that is one embodiment of the present disclosure, a non-aqueous electrolyte secondary battery having improved heat resistance can be provided.

BRIEF DESCRIPTION OF THE DRAWING

Embodiments of the present disclosure will be described based on the following FIGURE, wherein:

The Figure is a cross-sectional view of a non-aqueous electrolyte secondary battery as an example of an embodiment.

DESCRIPTION OF EMBODIMENTS

As a result of intensive studies to solve the aforementioned problems, the present inventors have found that heat resistance is improved when the surfaces of particles of a lithium-transition metal composite oxide which has a smaller particle size than the particle surface of a large-particle-size lithium-transition metal composite oxide contains a lot of lithium and elements of Groups 4 to 6 (hereinafter referred to as "M1") and also contains B on the surfaces of the particles of the lithium-transition metal composite oxide. This is thought to be the effect of the phenomenon whereby at high temperatures, Li remaining on the surface of the lithium-transition metal composite oxide or Li eluted from the inside of the lithium-transition metal composite oxide reacts with M1 and B, thereby forming an oxide coating film containing Li, M1, and B on the surfaces of the particles of the lithium-transition metal composite oxide. This coating film has conductivity but suppresses the reaction with the electrolyte. It is thought that since small-particle-size lithium-transition metal composite oxides have a larger surface area than large-particle-size lithium-transition metal composite oxides having the same mass, when the surface of small-particle-size lithium-transition metal composite oxide contains a lot of M1, the synergy between M1 and B becomes more significant and the aforementioned effect is obtained.

An example of an embodiment of a positive electrode active material for a non-aqueous electrolyte secondary battery according to the present disclosure, and a non-aqueous electrolyte secondary battery with the positive electrode active material, will be described below in detail. In the following description, a cylindrical battery in which a spirally wound electrode body 14 is housed in a bottomed cylindrical outer can 16 is taken as an example, but the outer body is not limited to a cylindrical outer can and may be, for example, a rectangular outer can or an outer body composed of a laminate sheet including a metal layer and a resin layer. The electrode body may be a laminated electrode body in which multiple positive electrodes and multiple negative electrodes are alternately laminated with a separator therebetween.

The Figure is a cross-sectional view of a non-aqueous electrolyte secondary battery 10 that is an example of an embodiment. As illustrated in the Figure, the non-aqueous electrolyte secondary battery 10 includes a wound electrode body 14, a non-aqueous electrolyte, and an outer can 16 that houses the electrode body 14 and the electrolyte. The electrode body 14 has a positive electrode 11, a negative electrode 12, and a separator 13, and has a winding structure in which the positive electrode 11 and the negative electrode 12 are spirally wound with the separator 13 therebetween. The outer can 16 is a bottomed cylindrical metal container having an opening on one axial side and the opening of the outer can 16 is closed by a sealing body 17. In the following, for convenience of explanation, the sealing body 17 side of the battery is the top and the bottom side of the outer can 16 is the bottom.

The non-aqueous electrolyte contains a non-aqueous solvent and an electrolyte salt dissolved in the non-aqueous solvent. Examples of the non-aqueous solvent include esters, ethers, nitriles, amides, and mixed solvents of two or more of these. The non-aqueous solvent may contain a halogen-substituted product obtained by substituting at least some of the hydrogen in these solvents with halogen atoms such as fluorine. Examples of the electrolyte salt include a lithium salt such as $LiPF_6$. Note that the electrolyte is not limited to a liquid electrolyte, and may be a solid electrolyte using a gel polymer or the like.

The positive electrode 11, the negative electrode 12, and the separator 13, which constitute the electrode body 14, are all strip-shaped long bodies, and are spirally wound so that they are alternately laminated in the radial direction of the electrode body 14. The negative electrode 12 has a size slightly larger than that of the positive electrode 11 in order to prevent precipitation of lithium. In other words, the negative electrode 12 is longer than the positive electrode 11 in the longitudinal direction and the width direction (lateral direction). The two separators 13 are one size larger than at least the positive electrode 11, and sandwich the positive electrode 11, for example. The electrode body 14 has a positive electrode lead 20 connected to the positive electrode 11 by welding or the like, and a negative electrode lead 21 connected to the negative electrode 12 by welding or the like.

Insulating plates 18 and 19 are placed above and below the electrode body 14. In the example shown in the Figure, the positive electrode lead 20 extends toward the sealing body 17 through a through hole in the insulating plate 18, and the negative electrode lead 21 extends toward the bottom of the outer can 16 through a space that is further out than the insulating plate 19. The positive electrode lead 20 is connected to the lower surface of the internal terminal plate 23 of the sealing body 17 by welding or the like, and a cap 27 which is the top plate of the sealing body 17 electrically connected to the internal terminal plate 23 serves as a positive electrode terminal. The negative electrode lead 21 is connected to the inner surface of the bottom of the outer can 16 by welding or the like, and the outer can 16 serves as a negative electrode terminal.

A gasket 28 is provided between the outer can 16 and the sealing body 17 to ensure the airtightness inside the battery. The outer can 16 has a grooved portion 22 where a part of the side surface protrudes inward for supporting the sealing body 17. The grooved portion 22 preferably has an annular shape extending along the circumferential direction of the outer can 16 so that its upper surface supports the sealing body 17. The sealing body 17 is fixed to the upper portion of the outer can 16 through the grooved portion 22 and the open end portion of the outer can 16 which is swaged to the sealing body 17.

The sealing body 17 has a structure in which an internal terminal plate 23, a lower valve 24, an insulating member 25, an upper valve 26, and a cap 27 are laminated in this order from the electrode body 14 side. Each member constituting the sealing body 17 has, for example, a disc shape or a ring shape, and the members other than the insulating member 25 are electrically connected to each other. The lower valve 24 and the upper valve 26 are connected to each other at their central portions, and an insulating member 25 is present between their peripheral portions. When the internal pressure of the battery rises due to abnormal heat generation, the lower valve 24 deforms and breaks the upper valve 26 so that it is pushed toward the cap 27, thereby blocking the current path between the lower valve 24 and the upper valve 26. When the internal pressure rises further, the upper valve 26 breaks and gas is discharged from the opening of the cap 27.

The positive electrode 11, the negative electrode 12, and the separator 13 constituting the electrode body 14, particularly the positive electrode active material in the positive electrode 11, will now be described in detail.

[Positive Electrode]

The positive electrode 11 has a positive electrode core and a positive electrode composite layer provided on the surface of the positive electrode core. The positive electrode core can be, for example, a foil of a metal, such as aluminum, which is stable in the potential range of the positive electrode 11, and a film in which the metal is disposed as its top layer. The positive electrode composite layer includes a positive electrode active material, a binder, and a conductive material, and is preferably provided on both sides of the positive electrode core except the portion to which the positive electrode lead 20 is connected. The positive electrode 11 can be fabricated by, for example, applying a positive electrode composite slurry containing a positive electrode active material, a binder, and a conductive material to the surface of the positive electrode core, and drying and compressing the coating film, thereby forming a positive electrode composite layer on both sides of the positive electrode core.

Examples of the conductive material contained in the positive electrode composite layer include carbon materials such as carbon black, acetylene black, Ketjen black, and graphite. Examples of the binder contained in the positive electrode composite layer include fluororesins such as polytetrafluoroethylene (PTFE) and polyvinylidene fluoride (PVdF), polyacrylonitrile (PAN), polyimide, acrylic resin, and polyolefin. These resins may be used in combination with, for example, a cellulose derivative such as carboxymethyl cellulose (CMC) or a salt thereof or polyethylene oxide (PEO).

The positive electrode active material contains a lithium-transition metal composite oxide containing 80 mol % or more of Ni and 0.1 to 1.5 mol % of B on the basis of the total number of moles of metal elements excluding Li, and at least B and at least one element (M1) selected from Groups 4 to 6 are present on the surfaces of the particles of the lithium-transition metal composite oxide. With a Ni content of 80 mol % or more, a battery having a high energy density can be obtained. The molar fraction of the metal element in the entire particles of the lithium-transition metal composite oxide is measured by inductively coupled plasma (ICP) emission spectroscopy.

The lithium-transition metal composite oxide may be a composite oxide represented by the general formula $Li_aNi_bCo_cM1_dM2_eB_fO_g$ (where $0.8 \leq a \leq 1.2$, $b \geq 0.80$, $c \leq 0.15$, M2 is one or more elements selected from Mn and Al, $0.01 \leq d \leq 0.05$, $0.01 \leq e \leq 0.012$, $0.001 \leq f \leq 0.015$, and $1 \leq g \leq 2$, and $b+c+d+e=1$). In other words, in the lithium-transition metal composite oxide, the molar fraction of M1 (the proportion of the number of moles of M1) to the total moles of Ni, Co, M1 and M2 (b+c+d+e) is preferably 0.01 to 0.05. Within this range, the synergy with B can be enhanced and the heat resistance of the battery can be further improved. In the lithium-transition metal composite oxide, the molar fraction of B (the proportion of the number of moles of B) to the total moles of Ni, Co, M1, and M2 (b+c+d+e) is preferably 0.001 to 0.015, more preferably 0.005 to 0.01. Within this range, the synergy with M1 can be enhanced and the heat resistance of the battery can be further improved. Considering the capacity and heat resistance, M2 is preferably Mn. Note that the positive electrode active material may include a lithium-transition metal composite oxide other than those represented by the aforementioned general formula, or other compounds, as long as the object of the present disclosure is not impaired.

The lithium-transition metal composite oxide is, for example, secondary particles formed by aggregation of primary particles. The particle size of the primary particles forming the secondary particles is, for example, 0.05 μm to 1 μm. The particle size of the primary particles is measured as the size of the circumscribing circle in the particle image observed by a scanning electron microscope (SEM). M1 and B may be present on the surfaces of the secondary particles of the lithium-transition metal composite oxide and also on the surfaces of the primary particles. In addition, some of M1 and B may also exist inside the primary particles, and form a solid solution together with other metal elements contained in the lithium-transition metal composite oxide.

The lithium-transition metal composite oxide is particles having a volume-based median size (D50) of, for example, 3 μm to 30 μm, preferably 5 μm to 25 μm, more preferably 7 μm to 15 μm. D50 refers to a particle size in which the cumulative frequency is 50% from the smallest particle size in the volume-based particle size distribution, and is also called a medium size. The particle size distribution of the lithium-transition metal composite oxide can be measured using a laser diffraction type particle size distribution measuring instrument (for example, MT3000II manufactured by MicrotracBEL Corp.) and using water as a dispersion medium.

Regarding the particles of the lithium-transition metal composite oxide, when particles having a volume-based particle size larger than 70% particle size (D70) are first particles, and particles having a volume-based particle size smaller than 30% particle size (D30) are second particles, the molar fraction (A2) of M1 on the basis of the total number of moles of metallic elements excluding Li on the surfaces of the second particles is greater than the molar fraction (A1) of M1 on the basis of the total number of moles of metallic elements excluding Li on the surfaces of the first particles. When A2>A1, the decomposition of the electrolyte on the surfaces of the second particles having a large surface area is more efficiently suppressed, thereby improving the heat resistance of the battery.

The ratio (A2/A1) of the molar fraction (A2) of M1 on the surfaces of the second particles to the molar fraction (A1) of M1 on the surfaces of the first particles is preferably 1.1 or more. This improves the heat resistance of the battery. Moreover, A2/A1 is preferably 1.5 or less to suppress a decrease in battery capacity.

Here, D70 refers to a particle size in which the cumulative frequency is 70% from the smallest particle size in the volume-based particle size distribution. Similarly, D30 refers to a particle size in which the cumulative frequency is 30% from the smallest particle size in the volume-based particle size distribution. For example, D70 is in the range of 9 to 19 μm, and D30 is in the range of 3 to 13 μm. A1 and A2 are molar fractions of M1 on the basis of the total moles of metal elements other than Li (total moles of Ni, Co, M1, and M2 (b+c+d+e)) determined by X-ray photoelectron spectroscopy (XPS). When the X-ray irradiation spot size is 1 mmΦ or more, several hundred particles of lithium-transition metal composite oxide are included in the irradiation spot, so that the average of the molar fractions of M1 on the surfaces of the first particles and the second particles, that is, A1 and A2, can be measured.

As long as the molar fractions of the first particles and the second particles measured by XPS satisfy the criteria A1<A2, the first particles may contain particles in which the molar fraction of M1 (A1) on the particle surface is equal to or higher than the molar fraction (A2) of the second particles. Further, the second particles may contain particles in which the molar fraction of M1 (A2) on their particle surface is equal to or lower than the molar fraction (A1) of the first particles. Further, A1>0, and M1 exists on both surfaces of the first particles and the second particles.

B is present on the surfaces of the first and second particles. The molar fraction of B (B1) on the surfaces of the first particles is preferably greater than the molar fraction of B (B2) on the surfaces of the second particles. The ratio (B1/B2) of the molar fraction (B1) of B on the surfaces of the first particles to the molar fraction (B2) of B on the surfaces of the second particles is preferably 1.1 or more. The presence of a large amount of B on the surfaces of the first particles can further improve the heat resistance of the battery, which is probably because increasing the ratio of B1/B2 makes the particle strength of the first particles, which has a significant impact on safety when particle cracks occur, higher than the particle strength of the second particles. Note that B1/B2 is preferably 1.5 or less to suppress a decrease in battery capacity. Similarly to A1 and A2, B1 and B2 can be measured by XPS. Note that B1 and B2 are molar fractions of B on the basis of the total moles of Ni, Co, M1, M2, and B (b+c+d+e+f)) determined by X-ray photoelectron spectroscopy (XPS).

On the surfaces of the particles of the lithium-transition metal composite oxide, M1 may be present in the form of a modified oxide represented by the general formula $Li_iM1_jO_k$ (where $0.2 \leq i/k \leq 0.8$ and $0.1 \leq j/k \leq 0.5$). B preferably exists in the form of a boron compound on the surfaces of the particles of the lithium-transition metal composite oxide. The boron compound may be any material that contains a boron element, and examples thereof include boric acid ($H_3BO_3$), boron oxide ($B_2O_3$), and lithium borate ($LiBO_2$ and $Li_2B_4O_7$). The boron compound provides a binding effect and is expected to provide an effect of making the lithium-transition metal composite oxide hard to crack.

The modified oxide $Li_iM1_jO_k$ may cover the entire surfaces of the secondary particles, or may be scattered on the particle surface. When it is particulate, the particle size of the modified oxide $Li_iM1_jO_k$ is generally smaller than the particle size of the primary particles constituting the lithium-transition metal composite oxide. Note that the particles of the modified oxide $Li_tM1_jO_k$ can be checked by SEM. The modified oxide $Li_tM1_jO_k$ is preferably attached to a wide area without being unevenly distributed on a part of the surfaces of the primary particles constituting the lithium-transition metal composite oxide.

The boron compound may be formed so as to cover the surfaces of the secondary particles and the modified oxide $Li_tM1_jO_k$ existing on the surfaces of the secondary particles, and attached thereto. At high temperatures, Li remaining on the surface of the lithium-transition metal composite oxide or Li eluted from the inside of the lithium-transition metal composite oxide reacts with M1 and B, thereby forming an oxide coating film containing Li, M1, and B on the surfaces of the particles of the lithium-transition metal composite oxide.

The lithium-transition metal composite oxide can be produced, for example, by the following procedure.

(1) A Li source such as lithium hydroxide is added to a composite oxide containing Ni, Co, and M2 (one or more elements selected from Mn and Al) that do not contain two types of Li having different D50, and fired, thereby synthesizing lithium-transition metal composite oxides (X2) and (Y2) having different D50. At this time, one lithium-transition metal composite oxide may be classified to obtain a lithium composite oxide having two average particle sizes. A known method can be used for the classification.

(2) A compound containing at least one element (M1) selected from Groups 4 to 6 is added to each of the lithium-transition metal composite oxides (X2) and (Y2), M1 is composited on the particle surface, and the result is then fired. Subsequently, the lithium-transition metal composite oxides (X3) and (Y3) in which M1 is present on the particle surface are mixed to obtain a mixed lithium-transition metal composite oxide (Z). Examples of the compound containing M1 include tungsten oxide ($WO_3$), tantalum oxide ($Ta_2O_5$), zirconium oxide ($ZrO_2$), and titanium oxide ($TiO_2$). The compounding uses a dry particle compounding device (for example, NOB-130 manufactured by Hosokawa Micron Corporation) or the like. At this time, a Li source such as lithium hydroxide may be added together with a compound containing M1.

(3) The mixed lithium-transition metal composite oxide (Z) and a B source, for example, boric acid ($H_3BO_3$), are dry-mixed, fired at a temperature in the range of 160 to 300° C. in the air, and then pulverized to obtain a positive electrode active material in which M1 and B are present on the surfaces of the particles.

The firing temperature in the above step (2) is, for example, in the range of 550° C. to 750° C., and as the temperature decreases, the molar fraction of M1 on the surfaces of the primary particles tends to increase and the solid solution amount of M1 tends to decrease. The state expressed by $A1<A2$ can be obtained by making the amount of M1 added to the small particles larger than the amount of M1 added to the large particles. The state expressed by $A1<A2$ can also be obtained by making the firing temperature for the small particles lower than the firing temperature of the large particles.

Alternatively, without mixing the lithium-transition metal composite oxides (X3) and (Y3) in which M1 is present on the particle surface in the above step (2), in the above step (3), a B source, such as $H_3BO_3$, may be dry-mixed with X3 and Y3, respectively, and the mixtures may be mixed after firing to obtain a positive electrode active material in which M1 and B are present on the surfaces of the particles.

Examples of B source include, in addition to boric acid, boron oxide (B2O3) and lithium borate ($LiBO_2$ and $Li_2B_4O_7$).

[Negative Electrode]

The negative electrode 12 has a negative electrode core and a negative electrode composite layer provided on the surface of the negative electrode core. The negative electrode core can be, for example, a foil of a metal, such as copper, which is stable in the potential range of the negative electrode 12, a film in which the metal is disposed as its top layer. The negative electrode composite layer includes a negative electrode active material and a binder, and is preferably provided on both sides of the negative electrode core except the portion to which the negative electrode lead 21 is connected. The negative electrode 12 can be fabricated by, for example, applying a negative electrode composite slurry containing a negative electrode active material and a binder to the surface of the negative electrode core, and drying and compressing the coating film, thereby forming a negative electrode composite layer on both sides of the negative electrode core.

The negative electrode composite layer contains, as a negative electrode active material, for example, a carbon-based active material that reversibly occludes and releases lithium ions. Suitable carbon-based active materials are natural graphite such as flake graphite, lump graphite, and earth graphite, and artificial graphite such as lump artificial graphite (MAG) and graphitized mesophase carbon microbeads (MCMB). The negative electrode active material may be a Si-based active material composed of at least one of Si and a Si-containing compound, or a combination of a carbon-based active material and a Si-based active material.

As in the case of the positive electrode 11, the binder contained in the negative electrode composite layer may be fluororesin, PAN, polyimide, acrylic resin, or polyolefin, but is preferably styrene-butadiene rubber (SBR). The negative electrode composite layer preferably further contains CMC or a salt thereof, polyacrylic acid (PAA) or a salt thereof, polyvinyl alcohol (PVA), or the like. Among these, SBR and CMC or a salt thereof, or PAA or a salt thereof, are preferably used in combination.

[Separator]

A porous sheet having ion permeability and insulation is used as the separator 13. Specific examples of the porous sheet include microporous thin films, woven cloths, and non-woven cloths. Materials suitable for the separator 13 include polyolefins such as polyethylene and polypropylene, and cellulose. The separator 13 may have a single-layer structure or a laminated structure. A heat-resistant layer or the like may be formed on the surface of the separator.

EXAMPLES

The present disclosure will be further described below in Examples, but the present disclosure is not limited to Examples.

Example 1

[Synthesis of Positive Electrode Active Material]

A nickel-cobalt-manganese composite hydroxide having a D50 having a size of 14 μm and a composition of $Ni_{0.84}Co_{0.10}Mn_{0.06}(OH)_2$, and nickel-cobalt-manganese composite hydroxide having a D50 having a size of 10 μm and a composition of $Ni_{0.84}Co_{0.10}Mn_{0.06}(OH)_2$, which are obtained by co-precipitation, are fired at 500° C. to obtain a nickel-cobalt-manganese composite oxide (X1) having a large average particle size and a nickel-cobalt-manganese composite oxide (Y1) having a small average particle size.

Next, lithium hydroxide and nickel-cobalt-manganese composite oxide (X1) having a large average particle size are mixed so that the molar ratio of Li to the total amount of Ni, Co, and Mn is 1.08:1. This mixture is fired in an oxygen atmosphere at 800° C. for 8 hours and then pulverized to obtain a lithium-transition metal composite oxide (X2) having a large average particle size.

Next, lithium hydroxide and nickel-cobalt-manganese composite oxide (Y1) having a small average particle size are mixed so that the molar ratio of Li to the total amount of Ni, Co, and Mn is 1.08:1. This mixture is fired in an oxygen atmosphere at 800° C. for 8 hours and then pulverized to obtain a lithium-transition metal composite oxide (Y2) having a small average particle size.

Next, the lithium-transition metal composite oxide (X2) having a large average particle size and tungsten oxide ($WO_3$) are dry-mixed so that the molar ratio between the total amount of Ni, Co, and Mn and W in $WO_3$ is 1:0.02, and W is composited on the surfaces of the particles. This mixture is fired in an oxygen atmosphere at 800° C. for 8 hours and then pulverized to obtain a lithium-transition metal composite oxide (X3) in which W is present on the surfaces of the particles and which has a large average particle size.

Next, the lithium-transition metal composite oxide (Y2) having a small average particle size and $WO_3$ are dry-mixed so that the molar ratio between the total amount of Ni, Co, and Mn and W in $WO_3$ is 1:0.022, and W is composited on the surfaces of the particles. This mixture is fired in an oxygen atmosphere at 800° C. for 8 hours and then pulverized to obtain a lithium-transition metal composite oxide (Y3) in which W is present on the surfaces of the particles and which has a small average particle size.

Next, the lithium-transition metal composite oxide (X3) in which W is present on the surfaces of the particles and which has a large average particle size and the lithium-transition metal composite oxide (Y3) in which W is present on the surfaces of the particles and which has a small average particle size are mixed at a ratio of 1:1 to obtain a mixed lithium-transition metal composite oxide (Z). W existing on the particle surface can be quantified by XPS, and solid solution W can be quantified by EDX. The presence of W in the form of lithium tungsten oxide on the particle surface can be checked by XRD, XPS, XAFS, or the like.

The ratio (A2/A1) of the molar fraction (A2) of W on the surfaces of the second particles, which have a volume-based particle size smaller than D30, to the molar fraction (A1) of W on the surfaces of the first particles, which have a volume-based particle size larger than D70, is 1.06. The molar fraction of W on each particle is determined by XPS.

Next, the mixed lithium-transition metal composite oxide (Z) and boric acid ($H_3BO_3$) are dry-mixed so that the molar ratio between the total amount of Ni, Co, and Mn and B in $H_3BO_3$ is 1:0.01 and fired at 300° C. for 3 hours in the air, and then pulverized to obtain a positive electrode active material in which W and B are present on the surfaces of the particles.

Analysis of the composition of the positive electrode active material by ICP showed that it is $Li_{1.01}Ni_{0.84}Co_{0.10}Mn_{0.06}W_{0.021}B_{0.01}O_2$. Note that the particle size distribution of the positive electrode active material is 12 μm for D50, 14 μm for D70, and 10 μm for D30.

[Positive Electrode Fabrication]

The aforementioned positive electrode active material, acetylene black, and polyvinylidene fluoride (PVdF) are mixed at a solid content mass ratio of 96.3:2.5:1.2 and an appropriate amount of N-methyl-2-pyrrolidone (NMP) is added to the mixture. After that, this is kneaded to prepare a positive electrode composite slurry. The positive electrode composite slurry is applied to both sides of the positive electrode core made of an aluminum foil, and the coating film is dried. After that, the coating film is rolled using a roller and cut into a predetermined electrode size to obtain a positive electrode having positive electrode composite layers on both sides of the positive electrode core. Note that an exposed portion where the surface of the positive electrode core is exposed is provided on a part of the positive electrode.

[Negative Electrode Fabrication]

Natural graphite is used as the negative electrode active material. A negative electrode active material, sodium carboxymethyl cellulose (CMC-Na), and styrene-butadiene rubber (SBR) are mixed in an aqueous solution at a solid content mass ratio of 100:1:1 to prepare a negative electrode composite slurry. The negative electrode composite slurry is applied to both sides of the negative electrode core made of a copper foil, and the coating film is dried. After that, the coating film is rolled using a roller and cut into a predetermined electrode size to obtain a negative electrode having negative electrode composite layers on both sides of the negative electrode core. Note that an exposed portion where the surface of the negative electrode core is exposed is provided on a part of the negative electrode.

[Preparation of Non-Aqueous Electrolyte]

Lithium hexafluorophosphate ($LiPF_6$) is dissolved, at a concentration of 1.0 mol/liter, in a mixed solvent in which ethylene carbonate (EC), ethyl methyl carbonate (EMC), and dimethyl carbonate (DMC) are mixed at a volume ratio of 3:3:4. Further, vinylene carbonate (VC) is dissolved in the aforementioned mixed solvent at a concentration of 2.0 mass % to prepare a non-aqueous electrolyte.

[Battery Fabrication]

An aluminum lead is attached to the exposed portion of the aforementioned positive electrode and a nickel lead is attached to the exposed portion of the aforementioned negative electrode, the positive electrode and the negative electrode are spirally wound with a polyolefin separator therebetween, and the result is then pressed in the radial direction into a flat-shape wound type electrode body. The electrode body is contained in an outer body made of an aluminum laminate sheet, and the opening of the outer body is sealed after injection of the aforementioned non-aqueous electrolyte, to obtain a non-aqueous electrolyte secondary battery with a design capacity of 650 mAh.

Example 2

A non-aqueous electrolyte secondary battery is fabricated in the same manner as in Example 1 except that $Ta_2O_5$ is mixed in place of $WO_3$ in the synthesis of the positive electrode active material.

Example 3

A non-aqueous electrolyte secondary battery is fabricated in the same manner as in Example 1 except that $ZrO_2$ is mixed in place of $WO_3$ in the synthesis of the positive electrode active material.

Example 4

A non-aqueous electrolyte secondary battery is fabricated in the same manner as in Example 1 except that, for the synthesis of the positive electrode active material, the lithium-transition metal composite oxide (Y2) having a small average particle size and $WO_3$ are mixed so that the molar ratio between the total amount of Ni, Co, and Mn and W in $WO_3$ is 1:0.028.

Example 5

A non-aqueous electrolyte secondary battery is fabricated in the same manner as in Example 1 except that, for the synthesis of the positive electrode active material, the mixed lithium-transition metal composite oxide (Z) and $H_3BO_3$ are dry-mixed so that the molar ratio between the total amount of Ni, Co, and Mn and B in $H_3BO_3$ is 1:0.005.

Example 6

In the synthesis of the positive electrode active material, the lithium-transition metal composite oxide (X3) having a large average particle size and boric acid ($H_3BO_3$) are dry-mixed so that the molar ratio between the total amount of Ni, Co, and Mn and B in $H_3BO_3$ is 1:0.012, and fired at 300° C. for 3 hours in the air to obtain a lithium-transition metal composite oxide (X4) in which B is present on the surface. The molar fraction of B on the particle surface is 0.012 on the basis of the total number of moles of Ni, Co and Mn. Next, the lithium-transition metal composite oxide (Y3) having a small average particle size and boric acid ($H_3BO_3$) are dry-mixed so that the molar ratio between the total amount of Ni, Co, and Mn and B in $H_3BO_3$ is 1:0.011, and fired at 300° C. for 3 hours in the air to obtain a lithium-transition metal composite oxide (Y4) in which B is present on the surface. The molar fraction of B on the particle surface is 0.011 on the basis of the total number of moles of Ni, Co and Mn. Next, a non-aqueous electrolyte secondary battery is fabricated in the same manner as in Example 1 except that the positive electrode active material is prepared by mixing the lithium-transition metal composite oxides (X4) and (Y4) in which B is present on the surface, at a mass ratio of 1:1.

Example 7

A non-aqueous electrolyte secondary battery is fabricated in the same manner as in Example 1 except that, for the synthesis of the positive electrode active material, the mixed lithium-transition metal composite oxide (Z) and $H_3BO_3$ are dry-mixed so that the molar ratio between the total amount of Ni, Co, and Mn and B in $H_3BO_3$ is 1:0.001.

Example 8

A non-aqueous electrolyte secondary battery is fabricated in the same manner as in Example 1 except that, for the synthesis of the positive electrode active material, the mixed lithium-transition metal composite oxide (Z) and $H_3BO_3$ are dry-mixed so that the molar ratio between the total amount of Ni, Co, and Mn and B in $H_3BO_3$ is 1:0.015.

Comparative Example 1

A non-aqueous electrolyte secondary battery is fabricated in the same manner as in Example 1 except that the synthesis of the positive electrode active material does not involve mixing $WO_3$ and the subsequent firing, and mixing $H_3BO_3$ and the subsequent firing.

Comparative Example 2

A non-aqueous electrolyte secondary battery is fabricated in the same manner as in Example 1 except that the synthesis of the positive electrode active material does not involve mixing $H_3BO_3$ and the subsequent firing.

Comparative Example 3

A non-aqueous electrolyte secondary battery is fabricated in the same manner as in Example 1 except that the synthesis of the positive electrode active material does not involve mixing $WO_3$ and the subsequent firing.

Comparative Example 4

A non-aqueous electrolyte secondary battery is fabricated in the same manner as in Example 1 except that, for the synthesis of the positive electrode active material, the lithium composite oxide (Y2) having a small average particle size and $WO_3$ are mixed so that the molar ratio between the total amount of Ni, Co, and Mn and W in $WO_3$ is 1:0.02.

Comparative Example 5

A non-aqueous electrolyte secondary battery is fabricated in the same manner as in Example 1 except that CaO is mixed in place of $WO_3$ in the synthesis of the positive electrode active material.

Comparative Example 6

A non-aqueous electrolyte secondary battery is fabricated in the same manner as in Example 1 except that, for the synthesis of the positive electrode active material, the mixed lithium-transition metal composite oxide (Z) and $H_3BO_3$ are dry-mixed so that the molar ratio between the total amount of Ni, Co, and Mn and B in $H_3BO_3$ is 1:0.0008.

Comparative Example 7

A non-aqueous electrolyte secondary battery is fabricated in the same manner as in Example 1 except that, for the synthesis of the positive electrode active material, the mixed lithium-transition metal composite oxide (Z) and $H_3BO_3$ are dry-mixed so that the molar ratio between the total amount of Ni, Co, and Mn and B in $H_3BO_3$ is 1:0.017.

An ARC test is performed on each of the batteries of Examples and Comparative Examples to evaluate the thermal runaway temperature. Table 1 shows the evaluation results. Table 1 also shows the metal elements of Groups 4 to 6 (M1) existing on the surface of the lithium-transition metal composite oxide, the ratio (A2/A1) of the molar fraction (A2) of M1 on the surfaces of the second particles to the molar fraction (A1) of M1 on the surfaces of the first particles, the molar fraction of B on the surfaces of the lithium-transition metal composite oxide, and the ratio (B2/B1) of the molar fraction (B1) of B on the surfaces of the first particles to the molar fraction (B2) of B on the surfaces of the second particles.

[Arc Test]

In an environment at 25° C., the fabricated battery is charged at a constant current of 0.3 It until the battery voltage became 4.2 V, and then charged at a constant voltage of 4.2 V until the current value became 0.05 It, to be brought into a charged state. Subsequently, after the temperature of the battery is raised to 130° C. in the ARC test device, the self-heating rate (° C./min) of the battery in an adiabatic environment is measured by observing the battery temperature with a thermocouple attached to the flat surface of the battery. The battery temperature observed when the self-heating rate of the battery reached 10° C./min is defined as the thermal runaway temperature.

TABLE 1

|  | Groups 4 to 6 metal elements (M1) | M1 molar fraction ratio (A2/A1) | B molar fraction (%) | B molar fraction ratio (B1/B2) | Thermal runaway temperature (° C.) |
|---|---|---|---|---|---|
| Example 1 | W | 1.06 | 1.0 | 1.0 | 180 |
| Example 2 | Ta | 1.06 | 1.0 | 1.0 | 184 |
| Example 3 | Zr | 1.05 | 1.0 | 1.0 | 182 |
| Example 4 | W | 1.13 | 1.0 | 1.0 | 190 |
| Example 5 | W | 1.06 | 0.5 | 1.0 | 175 |
| Example 6 | W | 1.06 | 1.0 | 1.1 | 185 |
| Example 7 | W | 1.06 | 0.1 | 1.0 | 171 |
| Example 8 | W | 1.06 | 1.5 | 1.0 | 180 |
| Comparative Example 1 | — | — | 0 | — | 150 |
| Comparative Example 2 | W | 1.06 | 0 | — | 155 |
| Comparative Example 3 | — | — | 1.0 | 1.0 | 153 |
| Comparative Example 4 | W | 1.00 | 1.0 | 1.0 | 160 |
| Comparative Example 5 | — (Ca) | — (1.06) | 1.0 | 1.0 | 161 |
| Comparative Example 6 | W | 1.06 | 0.08 | 1.0 | 158 |
| Comparative Example 7 | W | 1.06 | 1.7 | 1.0 | 161 |

As shown in Table 1, the thermal runaway temperatures of the batteries of Examples are all higher than those of the batteries of Comparative Examples. In other words, it shows that the batteries of Examples have improved battery heat resistance. When A2/A1 is 1.1 or more (Example 4) and B1/B2 is 1.1 or more (Example 6), the thermal runaway temperature is higher than that of Example 1.

REFERENCE SIGNS LIST

10 Secondary battery, 11 Positive electrode, 12 Negative electrode, 13 Separator, 14 Electrode body, 16 Outer can, 17 Sealing body, 18, 19 Insulating plate, 20 Positive electrode lead, 21 Negative electrode lead, 22 Grooved portion, 23 Internal terminal plate, 24 Lower valve, 25 Insulating member, 26 Upper valve, 27 Cap, 28 Gasket

The invention claimed is:

1. A positive electrode active material for a non-aqueous electrolyte secondary battery, wherein
    the positive electrode active material contains a lithium-transition metal composite oxide containing 80 mol % or more of Ni and 0.1 mol % to 1.5 mol % of B on the basis of the total number of moles of metal elements excluding Li,
    B and at least one element (M1) selected from Groups 4 to 6 are present on at least the surfaces of particles of the lithium-transition metal composite oxide, and
    when particles having a volume-based particle size larger than 70% particle size (D70) are first particles, and particles having a volume-based particle size smaller than 30% particle size (D30) are second particles, the molar fraction (A2) of M1 on the basis of the total number of moles of metallic elements excluding Li on the surfaces of the second particles is greater than the molar fraction (A1) of M1 on the basis of the total number of moles of metallic elements excluding Li on the surfaces of the first particles.

2. The positive electrode active material for a non-aqueous electrolyte secondary battery according to claim 1, wherein the lithium-transition metal composite oxide is a composite oxide represented by the general formula $Li_aNi_bCo_cM1_dM2_eB_fO_g$ (where $0.8 \leq a \leq 1.2$, $b \geq 0.80$, $c \leq 0.15$, M2 is one or more elements selected from Mn and Al, $0.01 \leq d \leq 0.05$, $0.01 \leq e \leq 0.012$, $0.001 \leq f \leq 0.015$, and $1 \leq g \leq 2$, and $b+c+d+e=1$).

3. The positive electrode active material for a non-aqueous electrolyte secondary battery according to claim 1, wherein, on the surfaces of the particles of the lithium-transition metal composite oxide, M1 is present in the form of a modified oxide represented by the general formula $Li_iM1_jO_k$ (where $0.2 \leq i/k \leq 0.8$ and $0.1 \leq j/k \leq 0.5$).

4. The positive electrode active material for a non-aqueous electrolyte secondary battery according to claim 1, wherein the ratio (A2/A1) of the molar fraction (A2) of M1 on the surfaces of the second particles to the molar fraction (A1) of M1 on the surfaces of the first particles is 1.1 or more.

5. The positive electrode active material for a non-aqueous electrolyte secondary battery according to claim 1, wherein the ratio (B1/B2) of the molar fraction (B1) of B on the surfaces of the first particles to the molar fraction (B2) of B on the surfaces of the second particles is 1.1 or more.

6. A non-aqueous electrolyte secondary battery comprising:
    a positive electrode containing the positive electrode active material according to claim 1;
    a negative electrode; and
    a non-aqueous electrolyte.

* * * * *